US010628328B2

(12) United States Patent
Hoffmann et al.

(10) Patent No.: US 10,628,328 B2
(45) Date of Patent: Apr. 21, 2020

(54) METHODS AND SYSTEMS INCLUDING A MEMORY-SIDE MEMORY CONTROLLER CONFIGURED TO INTERPRET CAPABILITIES TO PROVIDE A REQUESTED DATASET TO A CENTRAL PROCESSING UNIT

(71) Applicant: Hewlett Packard Enterprise Development LP, Houston, TX (US)

(72) Inventors: Moritz J. Hoffmann, Palo Alto, CA (US); Alexander Richardson, Palo Alto, CA (US); Dejan S. Milojicic, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 295 days.

(21) Appl. No.: 15/496,228

(22) Filed: Apr. 25, 2017

(65) Prior Publication Data
US 2018/0307623 A1 Oct. 25, 2018

(51) Int. Cl.
*G06F 12/1027* (2016.01)
*G06F 12/1045* (2016.01)
(Continued)

(52) U.S. Cl.
CPC ...... *G06F 12/1063* (2013.01); *G06F 12/1009* (2013.01); *G06F 12/1027* (2013.01);
(Continued)

(58) Field of Classification Search
CPC ............ G06F 12/1063; G06F 12/1009; G06F 12/1027; G06F 12/1054; G06F 12/1408;
(Continued)

(56) References Cited

U.S. PATENT DOCUMENTS 5,822,788 A 10/1998 Kahn et al.
9,405,561 B2 8/2016 Giroux

OTHER PUBLICATIONS

Watson et al, "Capability Hardware Enhanced RISC Instructions CHERI Instruction-set Architecture," University of Cambridge Computer Laboratory Technical Report No. 850 (UCAM-CL-TR-850), ISSN 1476-2986, Apr. 2014, pp. 1-131.*
(Continued)

*Primary Examiner* — Glenn Gossage
(74) *Attorney, Agent, or Firm* — Hewlett Packard Enterprise Patent Department

(57) ABSTRACT

Methods and systems directed to a memory-side memory controller for interpreting capabilities and returning datasets to a Central Processing Unit (CPU) are provided. The CPU is configured to translate a first virtual address from a first capability to a first physical address, wherein the first capability is sent by a client application. The CPU is further configured to send the first physical address to the memory-side memory controller through a memory fabric. The memory-side memory controller loads a second capability located in the first physical address from an external memory through the memory fabric, interprets an address encoded within the second capability as a second physical address, and returns a dataset located in the second physical address from the external memory to the CPU through the memory fabric. The client application may set an offset field containing an offset parameter along with the first capability, and the memory-side memory controller may be configured to read the offset field and apply the offset parameter when loading the second capability from the external memory. The computing system may also include a mechanism to validate a capability, such as a validity bit or cryptographic signature.

18 Claims, 9 Drawing Sheets

(51) Int. Cl.
H04L 9/32 (2006.01)
G06F 12/14 (2006.01)
G06F 12/1009 (2016.01)

(52) U.S. Cl.
CPC ........ *G06F 12/1408* (2013.01); *H04L 9/3247* (2013.01); *G06F 12/1054* (2013.01); *G06F 2212/1052* (2013.01); *G06F 2212/65* (2013.01); *G06F 2212/68* (2013.01)

(58) Field of Classification Search
CPC ......... G06F 2212/1052; G06F 2212/65; G06F 2212/68; G06F 12/1045; H04L 9/3247
See application file for complete search history.

(56) References Cited

OTHER PUBLICATIONS

"Capability-based Security," Wikipedia, revision dated Feb. 27, 2016, downloaded from https://en.wikipedia.org/w/index.php?title=Capability-based security&direction=prev&oldid=721382751 on May 29, 2019, 5 pages.*

"What is a Capability, Anyway," html web page dated Jan. 12, 2013, Copyright 1999 by Jonathan Shapiro, downloaded from https://archive.is/20130112225523/http://www.eros-os.org/essays/capintro.html on May 29, 2019, 5 pages.*

Hashemi, M, et al., Accelerating Dependent Cache Misses with an Enhanced Memory Controller, (Research Paper), Apr. 21, 2016, 12 Pgs., subsequently published in Proceedings of the 43rd ISCA, Jun. 18-22, 2016, pp. 444-455.

Yang, C-L. et al., Tolerating Memory Latency Through Push Prefetching for Pointer-intensive Applications, Oct. 2004, 30 Pgs., ACM Transactions on Architecture and Code Optimization, vol. V, No. N.

Zhang, L. et al., Pointer-based Prefetching Within the Impulse Adaptable Memory Controller: Initial Results, (Research Paper), 2000, 8 Pgs., Dept. of Computer Science, University of Utah.

* cited by examiner

METHODS AND SYSTEMS INCLUDING A MEMORY-SIDE MEMORY CONTROLLER CONFIGURED TO INTERPRET CAPABILITIES TO PROVIDE A REQUESTED DATASET TO A CENTRAL PROCESSING UNIT

BACKGROUND

Application users may be interested in retrieving datasets stored in large memories connected to a computing system. In some examples, memory controllers use memory banks attached to them to serve load and store requests. Other examples use Central Processing Unit (CPU) designs that expose a flat memory hierarchy to the programmer and require all memory operations to be executed inside the CPU. However, computers may have a multi-layer memory hierarchy with different characteristics per layer. Moving from the CPU to distant layers increases memory access latency, and therefore, has the challenge of pointer-intense workloads as access to pointers are mostly latency-limited.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

Figure 1:
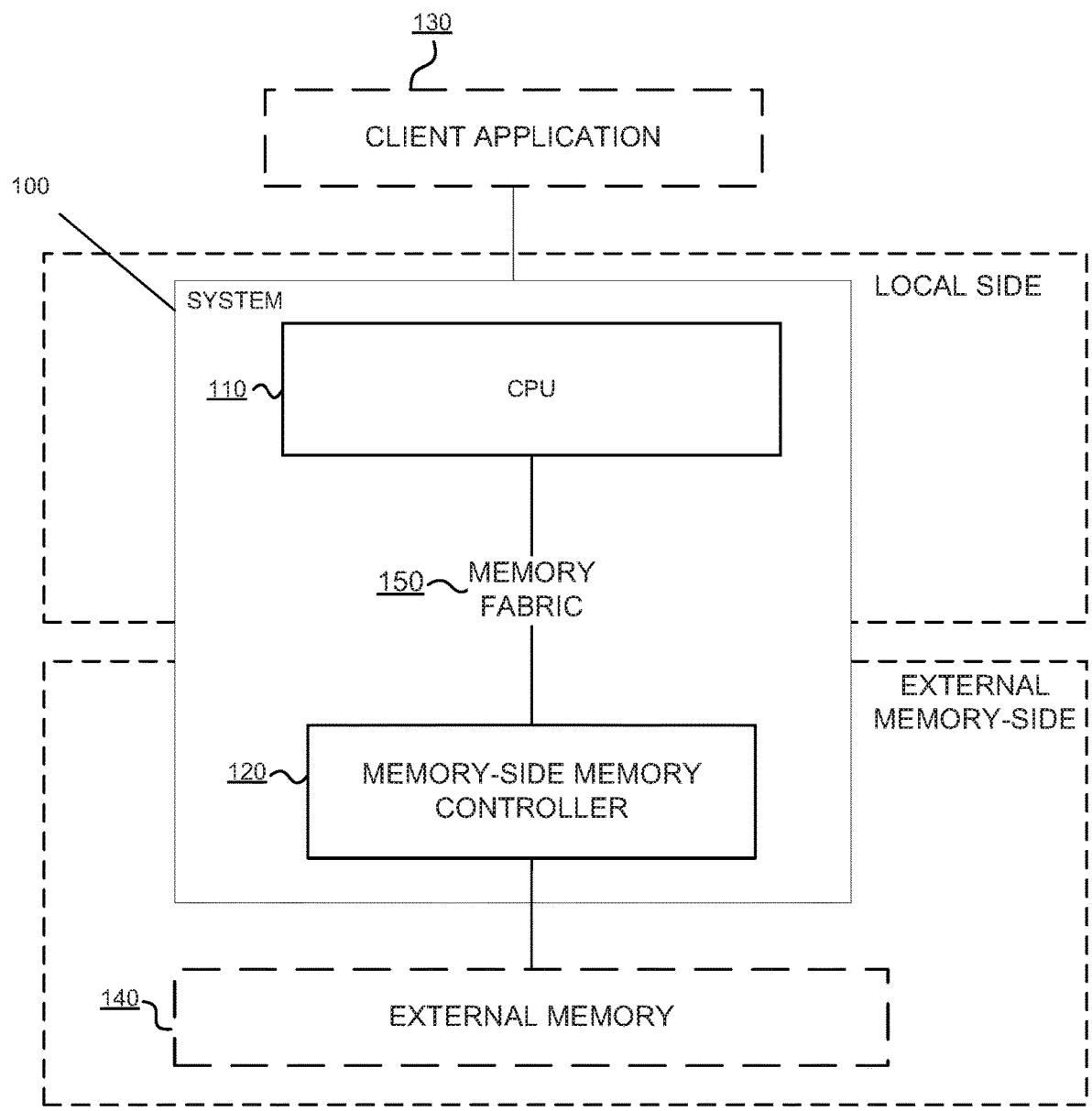
FIG. 1 is a block diagram illustrating a system example of a memory-side memory controller interpreting capabilities.

Applications retrieve datasets stored in large memories connected to a computing system. In some examples, computing systems coupled to memories adapted to perform memory transactions (e.g. load requests, store requests) may comprise their own processing circuitry such as a Central Processing Unit (CPU) or a System on a Chip (SoC), and a memory controller coupled to the memories.

Client applications such as Database Management Systems (DBMS) or other computing programs may request access to a specific dataset within a memory. Such client applications may request such access to the computing system coupled to the memory. In order to perform such operation, some examples use regular pointers, other examples use capabilities.

In the present disclosure, the term "capability" may be understood as an unforgeable pointer that grants access to a specific dataset (e.g. to a specific address or range of addresses in an address space) within a memory. The dataset that a capability grants access to may be as small as the smallest addressable object in the memory (e.g. a byte) or as large as the entire address space. A capability is distinguished from a regular pointer (1) in that a capability is unforgeable whereas a regular pointer is forgeable, and (2) in that a capability carries with it specified access permissions (e.g. read-only, read and write) whereas a regular pointer does not.

By properly controlling the allocation of capabilities within a system, fined-grained memory access protection may be enabled. A system/method may have access to a given physical address within the memory if the system/method has a memory capability that grants access thereto. The system/method may then perform the accesses to the physical memory address that are allowed by the capability. Therefore, a technical advantage of using capabilities over regular pointers is a fine-grained memory access, which may avoid many bugs and security compromises that may result from unauthorized access to memory (e.g. buffer, stack overflows).

As disclosed herein, capabilities grant access to certain datasets within a memory and may not be forged by the dataset retrieving system, nor the client application. An example of a higher authority that may decide on a dataset access policy, and therefore an authority that may be able to forge capabilities, may be the Operating System (OS) of the dataset retrieving computing device.

In some examples, the memory controller uses memory banks attached to it to serve load and store requests. Other examples use CPU designs that expose a flat memory hierarchy to the programmer and require all memory operations to be executed inside the CPU. However, computers may have a multi-layer memory hierarchy with different characteristics per layer. Moving from the CPU to distant layers increases memory access latency, and therefore, has the challenge of pointer-intense workloads as accesses to pointers are mostly latency-limited.

In the example of the present disclosure, a client application sends a first capability to a computer system that comprises a CPU adapted to (1) translate a first virtual address from a first capability to a first physical address, and (2) send the first physical address to a memory controller. The computer system may also comprise a memory-side memory controller coupled to an external memory, the memory-side memory controller being instructed to (1) load a second capability located in the first physical address from the external memory, (2) interpret an address encoded within the second capability as a second physical address, and (3) return a dataset located in the second physical address from the external memory.

The example of the present disclosure architecture comprises a CPU with a separate enhanced memory-side memory controller. The enhanced memory-side memory controller turns into a programmable device that is able to execute instructions. To expose a more powerful memory interface in combination with capability-based systems, the present disclosure example extends the memory-side memory controller with operations to be executed directly on the memory side. For example, dereference operations are executed inside the memory-side memory controller using capabilities. The enhanced memory-side memory controller offers an operation to dereference a pointer that points within a memory region. The present disclosure method improves the latency of double-loads from memory. For example, a register stores a capability to a memory location; the memory location stores another capability to the dataset the client application is interested in. Instead of first loading the capability from memory followed by another load to get the data, the present disclosure example programs the memory-side memory controller to directly dereference the capability in-memory. This may reduce the number of memory accesses by up to two times.

The following discussion is directed to various examples of the disclosure. The examples disclosed herein should not be interpreted, or otherwise used, as limiting the scope of the disclosure, including the claims. In addition, the following description has broad application, and the discussion of any example is meant only to be descriptive of that example, and not intended to intimate that the scope of the disclosure, including the claims, is limited to that example. In the foregoing description, numerous details are set forth to provide an understanding of the examples disclosed herein. However, it will be understood by those skilled in the art that the examples may be practiced without these details. While a limited number of examples have been disclosed, those skilled in the art will appreciate numerous modifications and variations therefrom. It is intended that the appended claims cover such modifications and variations that fall within the scope of the examples. Throughout the present disclosure, the terms "a" and "an" are intended to denote at least one of a particular element. In addition, as used herein, the term "includes" means includes but not limited to, the term "including" means including but not limited to. The term "based on" means based at least in part based on.

Referring now to the drawings, FIG. 1 is a block diagram illustrating a system example for a memory-side memory controller 120 interpreting capabilities. The system 100 comprises a CPU 110 and a memory-side memory controller 120. The CPU 110 is connected to the memory-side memory controller 120 through a memory fabric 150. The system 100 is connected to a client application 130 and an external memory 140. CPU 110 is part of the local side; whereas the memory-side memory controller 120 and the external memory 140 are part of the external memory side. As generally described herein, the local side refers to the side of the computing system 100 embedding the CPU 110. The external memory-side refers to the side of the computing system 100 that is external to the CPU 110, comprising the memory-side memory controller 120 and the external memory 140.

In this example, the client application 130 may request the system 100 to retrieve a specific dataset from the external memory 140. In order to do this, the client application 130 sends a first capability to the system 100. The first capability comprises a first address which may be either a first virtual address or a first physical address. When the first address is a first virtual address, the CPU 110 is adapted to read the first virtual address and to translate the first virtual address to a first physical address. The CPU 110 is adapted to send the first physical address to the memory-side memory controller 120. The memory-side memory controller 120 is coupled to the external memory 140 through the memory fabric 150. The memory-side memory controller 120 is adapted to access the first physical address in the external memory 140 and to load a second capability found therein. The memory-side memory controller 120 is further adapted to interpret an address encoded within the second capability as a second physical address. The memory-side memory controller 120 may be configured to access the second physical address in the external memory 140 and to load the dataset from the external memory 140. The memory-side memory controller 120 is configured to return the dataset and the second physical address to the CPU 110 for the client application 130 to consume.

In the present disclosure, the terms "physical address" and "virtual address" are used. The physical address of a dataset is actually the real address within a memory (e.g. external memory 140) where the dataset is located. The term virtual address is referred to as an address used by computer software programs as a reference point in virtual memory. Therefore, because each software program uses its own virtual addresses, each application has its own private address space, and no program can read or write to the memory of another program. With virtual addressing, all application memory accesses go to a page table, which then maps from the virtual to the physical address.

Figure 2:
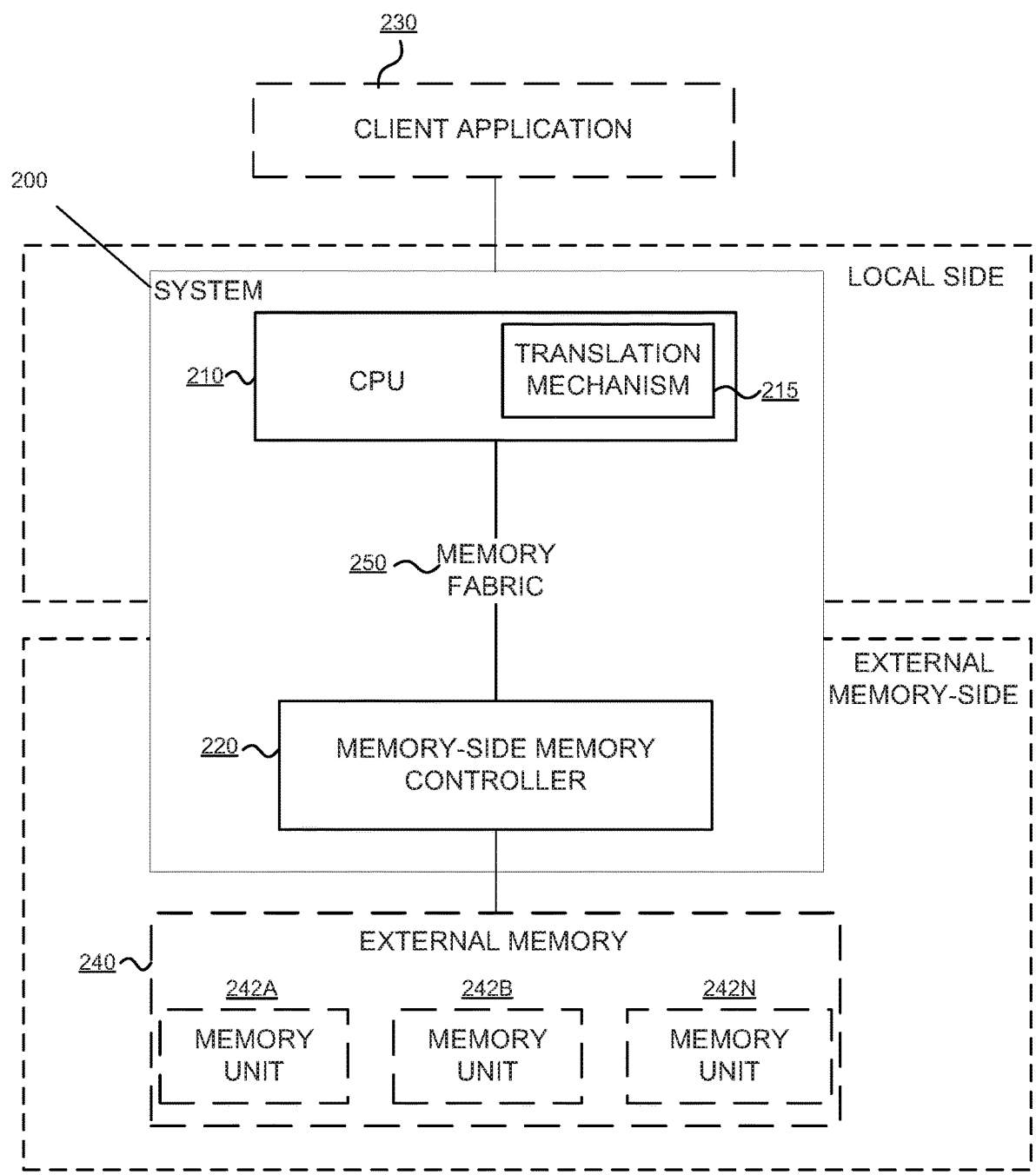
FIG. 2 is a block diagram illustrating a system example of a memory-side memory controller interpreting capabilities using a translation mechanism.

FIG. 2 is a block diagram illustrating a system example for a memory-side memory controller interpreting capabilities using a translation mechanism. The system 200 comprises a CPU 210 and a memory-side memory controller 220. The CPU 210 is connected to the memory-side memory controller 220 through a memory fabric 250. The system 200 is connected to a client application 230 and an external memory 240. The external memory 240 comprises a first memory unit 242A, a second memory unit 242B, to an Nth memory unit 242N, where N is a positive integer. CPU 210 is part of the local side; whereas the memory-side memory controller 220 and the external memory 240 are part of the external memory side. The CPU 210, the memory-side memory controller 220, the client application 230, the external memory 240, and the memory fabric 250 may be similar or the same as the CPU 110, the memory-side memory controller 120, the client application 130, the external memory 140, and the memory fabric 150 from FIG. 1. The CPU 210 further comprises a translation mechanism 215.

In the example, the client application 230 may request the system 200 to retrieve a specific dataset from the external memory 240. In order to start the retrieval, the client application 230 sends a first capability to the system 200. The first capability comprises a first address, which may be either a first virtual address or a first physical address.

In one example of the present disclosure, the first capability comprises a virtual address, and the CPU 210 is instructed to translate the first virtual address to a first physical address via a translation mechanism 215 managed by the OS. As a first example of translation mechanism 215, the CPU 210 may perform such translation using Memory Management Unit (MMU) pages that have access to a set of page tables. In the present disclosure, an MMU may be understood as a computer hardware unit having all memory references passed through itself, primarily performing translation of virtual memory addresses to physical addresses. In the present example, the MMU may be implemented as a port of the CPU 210, however, it can also be in the form of a separate Integrated Circuit (IC). The page tables may comprise the mapping of virtual addresses (e.g. the first virtual address) to their corresponding physical addresses (e.g. first physical address) within an external memory 240. The CPU 230 may be further restricted to perform load/store operations in such configuration. As a second example of translation mechanism 215, the CPU 210, may perform such translation using a Translation Look-Aside Buffer (TLB). The TLB may be coupled to the CPU 210. In the present disclosure, the TLB may be understood as a memory cache that is used to reduce the time taken to access a user memory location, and comprises a plurality of TLB entries. TLB entries may comprise the mapping from the first virtual address to the first physical address. The CPU 210 may be configured to translate the first virtual address to the first physical address based on the TLB entries.

Once the first virtual address has been translated to the first physical address, or the first address directly comprises a first physical address, the CPU 210 is adapted to send the first physical address to the memory-side memory controller 220. The memory-side memory controller 220 is coupled to the external memory 240 through the memory fabric 250. The memory-side memory controller 220 is adapted to access the first physical address in the external memory 240 and to load a second capability found therein. The memory-side memory controller 220 is further adapted to interpret an address encoded within the second capability as a second physical address. The memory-side memory controller 220 is configured to access the second physical address in the external memory 240 and load the dataset from the external memory 240. The memory-side memory controller 220 is configured to return the dataset and the second physical address to the CPU 210 for the client application 230 to consume.

Figure 3:
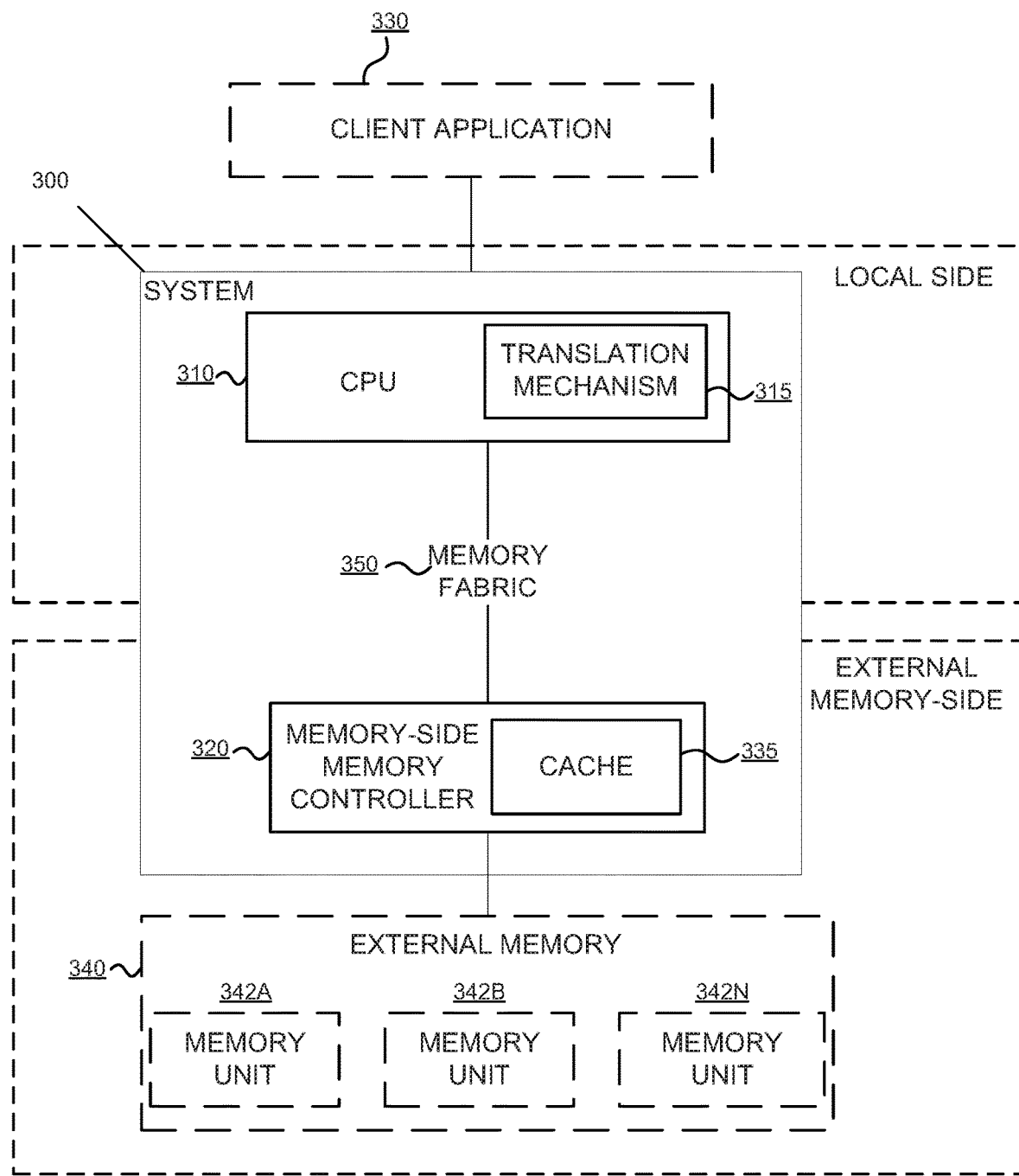
FIG. 3 is a block diagram illustrating a system example of a memory-side memory controller interpreting capabilities using a translation mechanism and a memory-side memory controller cache.

FIG. 3 is a block diagram illustrating a system example for a memory-side memory controller interpreting capabilities using a translation mechanism and a memory-side memory controller cache. The system 300 comprises a CPU 310 and a memory-side memory controller 320. The CPU 310 is connected to the memory-side memory controller 320 through a memory fabric 350. The system 300 is connected to a client application 330 and an external memory 340. The external memory 340 comprises a first memory unit 342A, a second memory unit 342B, to an Nth memory unit 342N, where N is a positive integer. CPU 310 is part of the local side; whereas the memory-side memory controller 320 and the external memory 340 are part of the external memory side. The CPU 310, the memory-side memory controller 320, the client application 330, the external memory 340, and the memory fabric 350 may be similar to or the same as the CPU 110, the memory-side memory controller 120, the client application 130, the external memory 140, and the memory fabric 150 from FIG. 1. The CPU 310 further comprises a translation mechanism 315. The memory-side memory controller 320 further comprises a memory-side memory controller cache 335.

In this example, the client application 330 may request the system 300 to retrieve a specific dataset from the external memory 340. In order to do this, the client application 330 sends a first capability to the system 300. The first capability comprises a first address which may be either a first virtual address or a first physical address. Where the first address is a first virtual address, the CPU 310 may further comprise a translation mechanism 315 (e.g. MMU, TLB of translation mechanism 215 from FIG. 2) which may adapt the CPU 310 to read the first virtual address and to translate the first virtual address to a first physical address. The translation mechanism 315 may be managed by the OS. The CPU 310 is adapted to send the first physical address to the memory-side memory controller 320. The memory-side memory controller 320 is coupled to the external memory 340 through the memory fabric 350. The memory-side memory controller 320 is adapted to access the first physical address in the external memory 340 and to load a second capability found therein. The memory-side memory controller 320 is further adapted to interpret an address encoded within the second capability as a second physical address. The address encoded within the second capability may be either a second physical address or a second virtual address.

In an example of the present disclosure, the address encoded within the second capability may be a second virtual address. Then, the memory-side memory controller 320 is instructed to interpret the second virtual address as a second physical address. System 300 may comprise a memory-side memory controller cache 335 within the memory-side memory controller 320. In the present disclosure, the term "cache" may be understood as a hardware or software component that stores data so future requests for that data can be served faster. The data stored in the cache might be the result of an earlier computation (e.g. the second physical address) or the duplicate of data stored elsewhere (e.g. the dataset). As a first example, the CPU 310 may comprise an MMU that have access to a set of page tables. The set of page tables may comprise the mapping of virtual addresses (e.g. second virtual address) to their corresponding physical addresses (e.g. second physical address) within an external memory 340. Then, the CPU 310 may be instructed to transfer the set of page tables to the memory-side memory controller cache 335 from the memory-side memory controller 320. Once the memory-side memory controller cache 335 contains the set of page tables, the memory-side memory controller 320 may translate the second virtual address to the second physical address based on the set of page tables. As a second example, the CPU 310 may comprise a TLB that comprises a plurality of TLB entries. The plurality of TLB entries may comprise the mapping of virtual addresses (e.g. second virtual address) to their corresponding physical addresses (e.g. first physical address) within an external memory 340. Then, the CPU 310 may be instructed to transfer the plurality of TLB entries to the memory-side memory controller cache 335 from the memory-side memory controller 320. Once the memory-side memory controller cache 335 contains the plurality of TLB entries, the memory-side memory controller 320 may translate the second virtual address to the second physical address based on the plurality of TLB entries.

Once the second virtual address has been interpreted as the second physical address, or the second address directly comprises the second physical address, the memory-side memory controller 320 is configured to access the second physical address in the external memory 340 and load the dataset located therein. The memory-side memory controller 340 is configured to return the dataset and the second physical address to the CPU 310 for the client application 330 to consume. In some examples, the memory-side memory controller 320 temporarily stores the dataset in the memory-side memory controller cache 335. In more examples, the system 300 may not comprise the memory-side memory controller cache 335 in the memory-side memory controller 320 if the second address directly comprises the second physical address.

Figure 4:
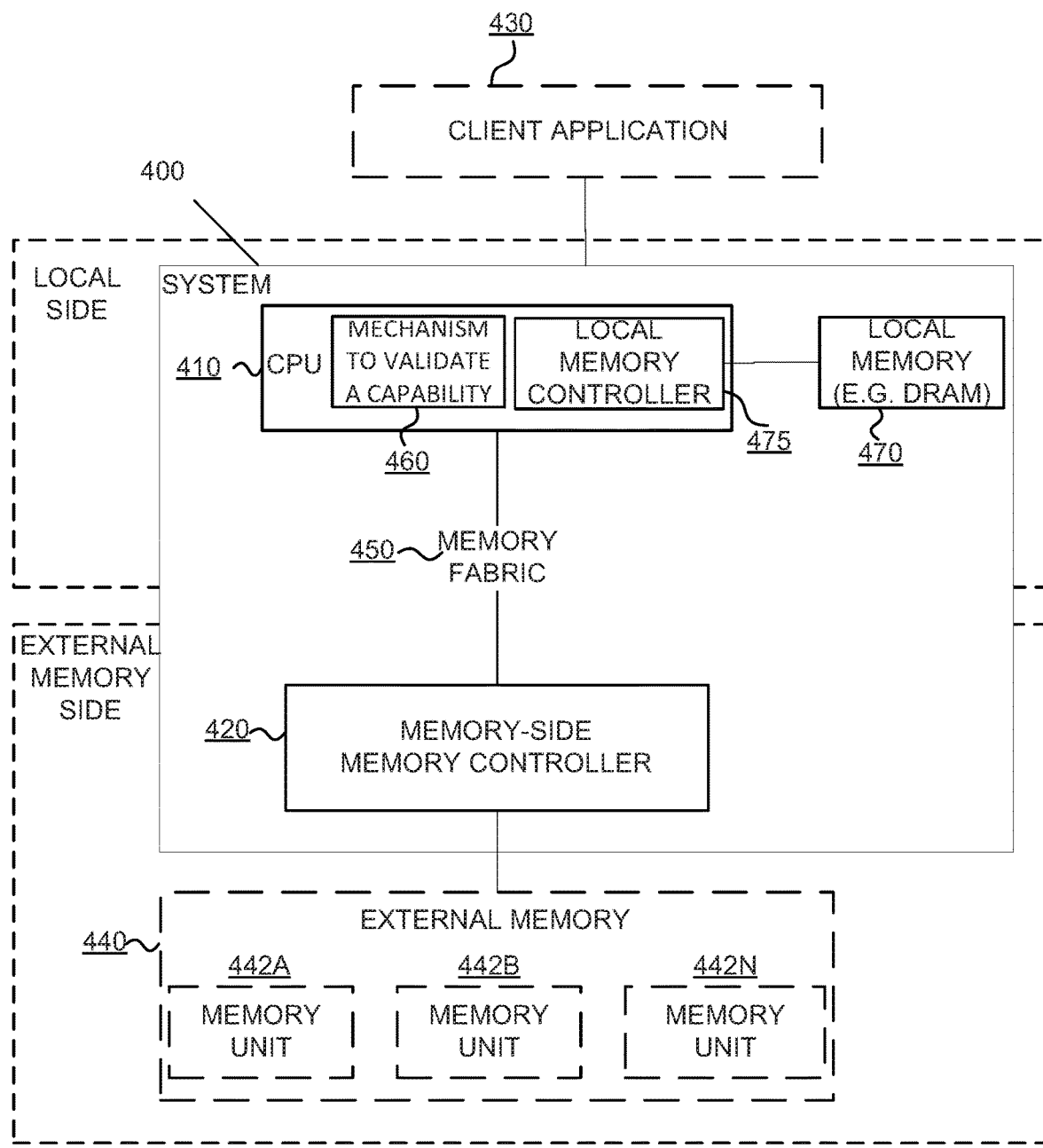
FIG. 4 is a block diagram illustrating a system example of a memory-side memory controller interpreting capabilities using a mechanism to validate a capability.

FIG. 4 is a block diagram illustrating a system example for a memory-side memory controller interpreting capabilities using a mechanism to validate a capability. The system 400 comprises a CPU 410 and a memory-side memory controller 420. The CPU 410 is connected to the memory-side memory controller 420 through a memory fabric 450. The system 400 is connected to a client application 430 and an external memory 440. The external memory 440 comprises a first memory unit 442A, a second memory unit 442B, to an Nth memory unit 442N, where N is a positive integer. The CPU 410 further comprises a local memory controller 475 linked to a local memory 470. CPU 410, the local memory 470, and the local memory controller 475 are part of the local side; whereas the memory-side memory controller 420 and the external memory 440 are part of the external memory side. The CPU 410, the memory-side memory controller 420, the client application 430, the external memory 440, and the memory fabric 450 may be similar to or the same as the CPU 110, the memory-side memory controller 120, the client application 130, the external memory 140, and the memory fabric 150 of FIG. 1. The CPU 410 further comprises a mechanism 460 to validate a capability.

In this example, the client application 430 may request the system 400 to retrieve a specific dataset from the external memory 440. In order to do this, the client application 430 sends a first capability to the system 400. The CPU 410 is adapted to check whether the first capability is a valid capability based on a mechanism 460 to validate a capability. The CPU 410 is adapted to reject external memory 440 access if the first capability is not a valid capability. The first capability comprises a first address which may be either a first virtual address or a first physical address. When the first address is a first virtual address, the CPU 410 is adapted to read the first virtual address and translate the first virtual address to a first physical address. The CPU 410 is adapted to send the first physical address to the memory-side memory controller 420. The memory-side memory controller 420 is coupled to the external memory 440 through the memory fabric 450. The memory-side memory controller 420 is adapted to access the first physical address in the external memory 440 and load a second capability located therein. The memory-side memory controller 420 is adapted to check whether the second capability is a valid capability based on the mechanism 460 to validate a capability. The memory-side memory controller 420 is adapted to reject external memory 440 access if the second capability is not a valid capability. The memory-side memory controller 420 is further adapted to interpret an address encoded within the second capability as a second physical address. Then, the memory-side memory controller 420 is configured to access the second physical address in the external memory 440 and load the dataset located therein. The memory-side memory controller 440 is configured to return the dataset and the second physical address to the CPU 410 for the client application 430 to consume.

As discussed above, the CPU 410 from system 400 may further comprise a local memory controller 475 connected to the local memory 470. The local memory 470 may be a Random Access Memory (RAM), Dynamic Random Access Memory (DRAM), Synchronous Dynamic Random Access Memory (SDRAM) or any other memory type. As a first example of a mechanism 460 to validate a capability, the local memory 470 is adapted to receive a validity bit during the booting up of CPU 410. The validity bit is sent by the OS of system 400. That validity bit may be used to check whether the incoming capabilities are valid capabilities or not. The CPU 410 is adapted to access the validity bit stored in the local memory 470 through the local memory controller 475. The CPU 410 is further adapted to check whether the first capability is a valid capability based on the validity bit. The CPU 410 is adapted to reject access to external memory 440 if the first capability is not a valid capability, based on the validity bit. The CPU 410 is configured to transfer the validity bit to the memory-side memory controller 420 through the memory fabric 450. The memory-side memory controller 420 is adapted to access the validity bit transferred from the CPU 410 and to check whether the second capability is a valid capability based on the validity bit. The memory-side memory controller 420 is adapted to reject access to external memory 400 if the second capability is not a valid capability, based on the validity bit. As a second example of mechanism 460 to validate a capability, the local memory 470 is adapted to receive a cryptographic signature. That cryptographic signature may be used to check whether the incoming capabilities are valid capabilities or not. The CPU 410 is adapted to access the cryptographic signature stored in the local memory 470 through the local memory controller 475. The CPU 410 is further adapted to check whether the first capability is a valid capability based on the cryptographic signature. The CPU 410 is adapted to reject access to external memory 440 if the first capability is not a valid capability, based on the cryptographic signature. The CPU 410 is configured to transfer the cryptographic signature to the memory-side memory controller 420 through the memory fabric 450. The memory-side memory controller 420 is adapted to access the cryptographic signature transferred from the CPU 410 and to check whether the second capability is a valid capability based on the cryptographic signature. The memory-side memory controller 420 is adapted to reject access to external memory 440 if the second capability is not a valid capability, based on the cryptographic signature.

Figure 5:
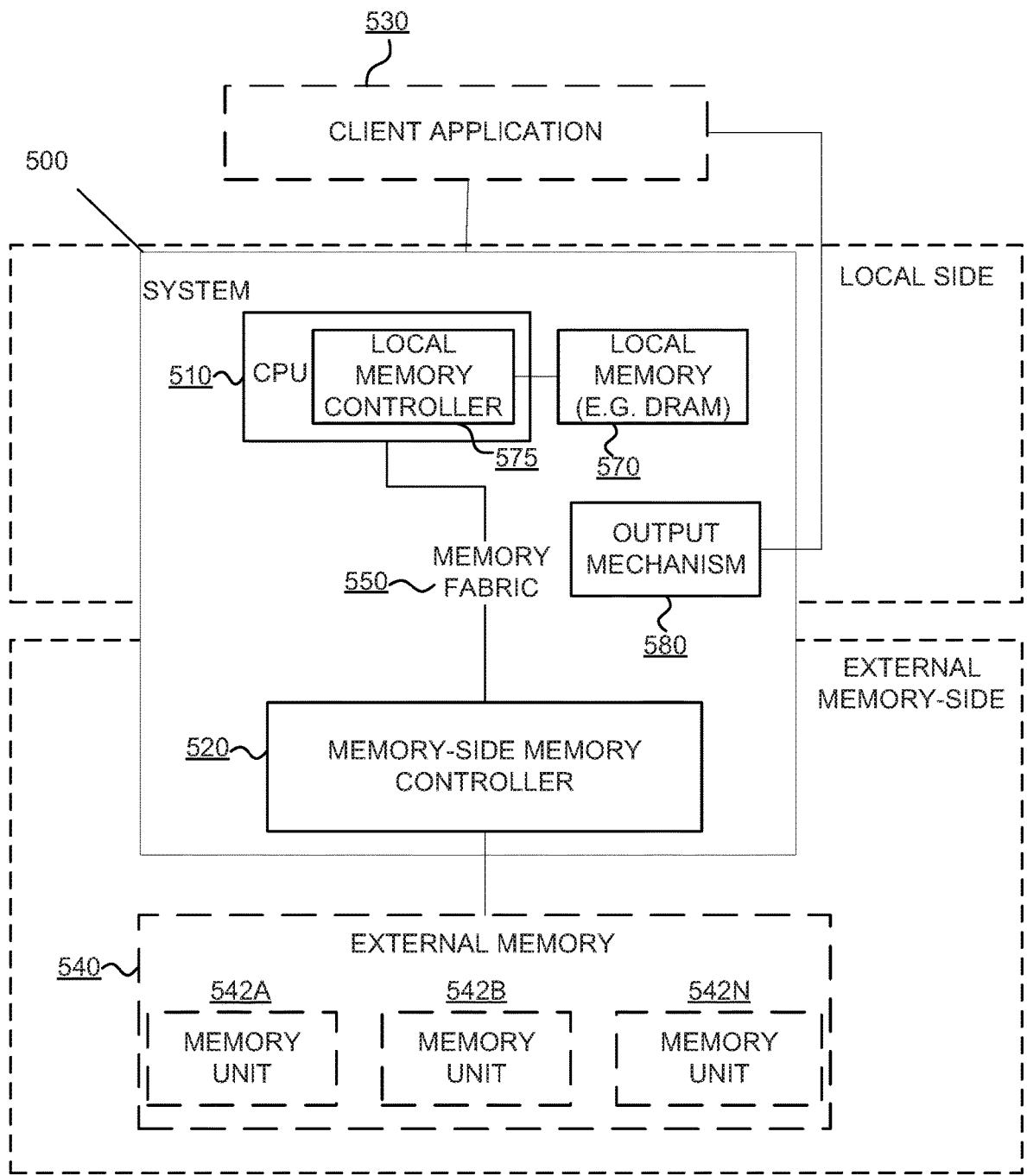
FIG. 5 is a block diagram illustrating a system example of a memory-side memory controller interpreting capabilities using an output mechanism.

FIG. 5 is a block diagram illustrating a system example for a memory-side memory controller interpreting capabilities using an output mechanism. The system 500 comprises a CPU 510 and a memory-side memory controller 520. The CPU 510 is connected to the memory-side memory controller 520 through a memory fabric 550. The system 500 is connected to a client application 530 and an external memory 540. The external memory 540 comprises a first memory unit 542A, a second memory unit 542B, to an Nth memory unit 542N, where N is a positive integer. CPU 510, the local memory 570, and the local memory controller 575 are part of the local side; whereas the memory-side memory controller 520 and the external memory 540 are part of the external memory side. The CPU 510, the memory-side memory controller 520, the client application 530, the external memory 540, and the memory fabric 550 may be similar to or the same as the CPU 110, the memory-side memory controller 120, the client application 130, the external memory 140, and the memory fabric 150 of FIG. 1. The system 500 further comprises an output mechanism 580.

In this example, the client application 530 may request the system 500 to retrieve a specific dataset from the external memory 540. In order to do this, the client application 530 sends a first capability to the system 500. The first capability comprises a first address which may be either a first virtual address or a first physical address. When the first address is a first virtual address, the CPU 510 is adapted to read the first virtual address and translate the first virtual address to a first physical address. The CPU 510 is adapted to send the first physical address to the memory-side memory controller 520. The memory-side memory controller 520 is coupled to the external memory 540 through the memory fabric 550. The memory-side memory controller 520 is adapted to access the first physical address in the external memory 540 and load a second capability found therein. The memory-side memory controller 520 is further adapted to interpret an address encoded within the second capability as a second physical address. Then, the memory-side memory controller 520 is configured to access the second physical address in the external memory 540 and load the dataset from the external memory 520. The memory-side memory controller 520 is configured to return the dataset and the second physical address to the CPU 510 for the client application 530 to consume, via an output mechanism 580.

As a first example of output mechanism 580, the CPU 510 from the system 500 may comprise a CPU cache. The memory-side memory controller 520 may load the dataset and the second physical address into the CPU cache for the client application 530 to consume. As a second example of output mechanism 580, the CPU 510 may comprise a register. The memory-side memory controller 520 may load the dataset and the second physical address into the register for the client application 530 to consume. A third example of output mechanism 580, may include both the CPU cache and the register. The memory-side memory controller 520 may load the dataset and the second physical address into the CPU cache, and then the CPU 510 may transfer the dataset and the second physical address from the CPU cache to the register for the client application 530 to consume.

Figure 6:
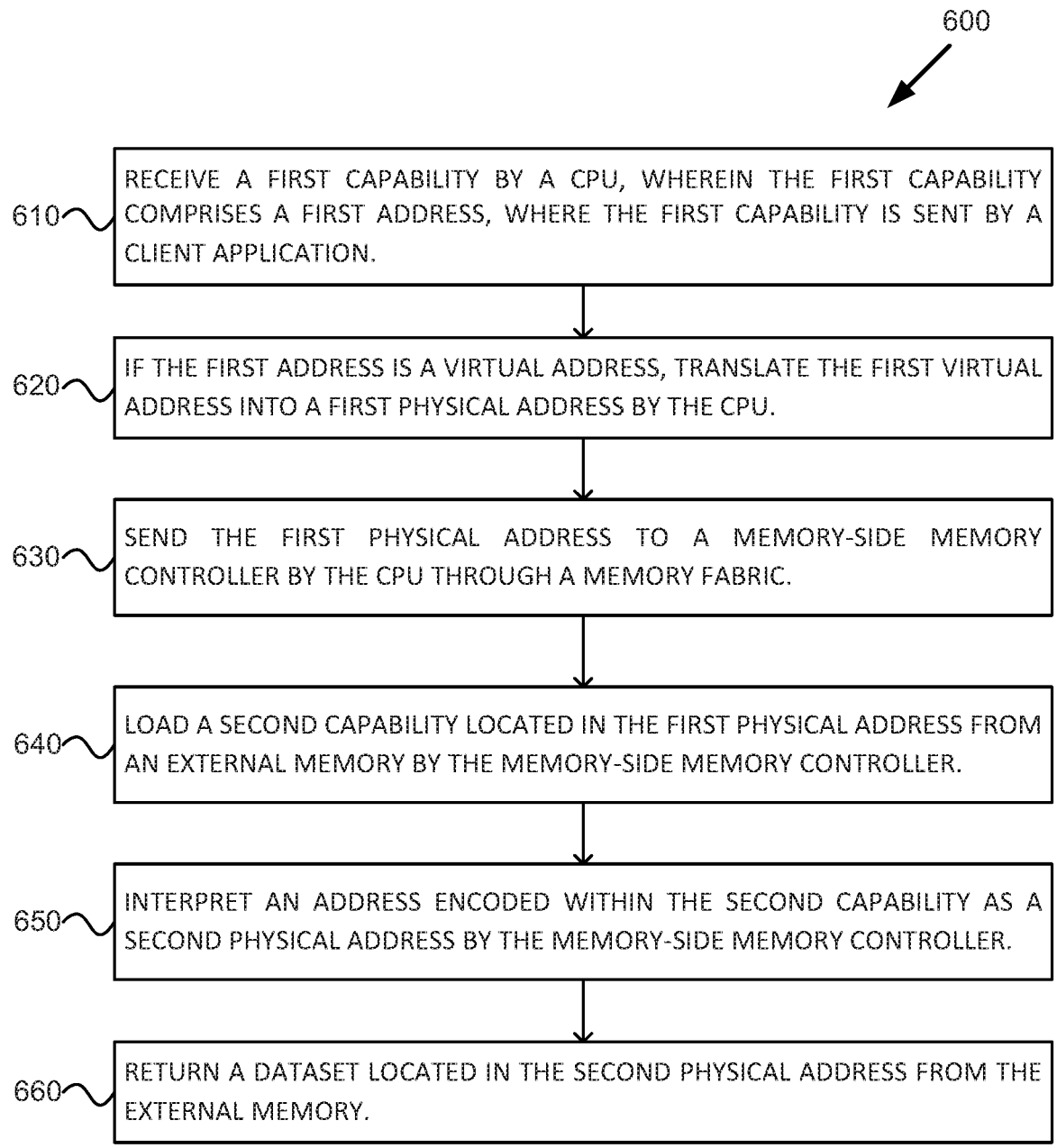
FIG. 6 is a flow chart of an example of a memory-side memory controller interpreting capabilities.

FIG. 6 is a flow chart of an example for a memory-side memory controller interpreting capabilities. Method 600 may be implemented, for example, by system 100 from FIG. 1. Method 600 as well as the methods described herein can, for example, be implemented in the form of machine readable instructions stored on a memory of a computing system (see, e.g. the implementation of instructions 941-947 of system 900 from FIG. 9), in the form of electronic circuitry or another suitable form. The method 600 comprises a plurality of steps (e.g. steps 610-660) that may be performed.

At step 610, the system (e.g. system 100) receives a first capability by the CPU. The first capability may comprise a first address and is sent by a client application.

Next, if the first address is a virtual address, the CPU may translate the first address into a first physical address (step 620).

At step 630, the first physical address is sent to a memory-side memory controller by the CPU through a memory fabric.

At step 640, a second capability located in the first physical address may be loaded from an external memory by the memory-side memory controller.

At step 650, an address encoded within the second capability is interpreted as a second physical address by the memory-side memory controller.

Lastly, at step 660, a dataset located in the second physical address is returned to the CPU from the external memory.

Figure 7:
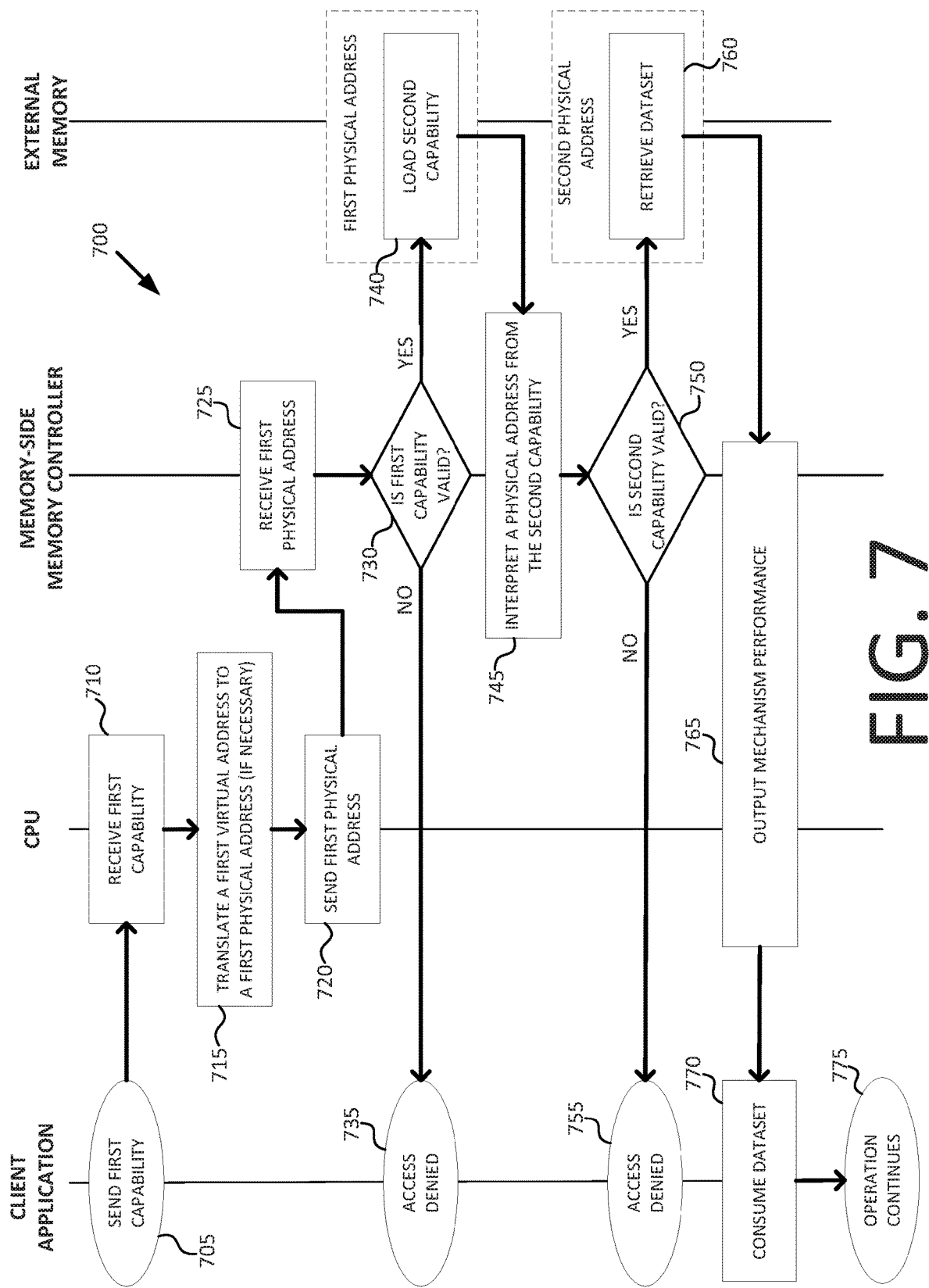
FIG. 7 is a flow chart of another example of a memory-side memory controller interpreting capabilities.

FIG. 7 is a flow chart of another example for a memory-side memory controller interpreting capabilities. Method 700 may be performed, for example, by system 100 of FIG. 1. Method 700 as well as the methods described herein can, for example, be implemented in the form of machine readable instructions stored on a memory of a computing system (see, e.g. the implementation of instructions 941-947 of system 900 from FIG. 9), in the form of electronic circuitry or another suitable form. FIG. 7 comprises four columns, with each column including the actions performed by a certain element. From left to right, the first column includes the actions performed by the client application (e.g. client application 130 from FIG. 1), the second column includes the actions performed by the CPU (CPU 110 from FIG. 1), the third column includes the actions performed by the memory-side memory controller (e.g. memory-side memory controller 120 from FIG. 1), and the fourth column includes the actions performed by the external memory (e.g. external memory 140 from FIG. 1).

Method 700 may comprise the step 705 of sending the first capability from the client application to the CPU. Method 700 may comprise the step 710 of receiving the first capability by the CPU. If the first capability comprises a physical address, the first physical address is sent to the memory-side memory controller at step 720. If the first capability comprises a virtual address, the CPU may first perform the step 715 of translating a first virtual address from the first capability to a first physical address (e.g. using an MMU having access to a set of page tables, or using a plurality of TLB entries), and then the CPU may perform step 720. Step 720 comprises sending the first physical address from the CPU through the memory fabric to the memory-side memory controller. Step 725 comprises receiving the first physical address at the memory-side memory controller through the memory fabric.

Once the memory-side memory controller receives the first physical address, the memory-side memory controller may perform the step 730 of checking whether the first capability is a valid capability or not (e.g. using a validity bit, or using a cryptographic signature). If the first capability is not a valid capability (NO branch of step 730), the memory-side memory controller may perform step 735 of rejecting access to the external memory and therefore, denying access to the dataset. On the contrary, if step 730 determines that the first capability is a valid capability (YES branch of step 730), then the memory-side memory controller may perform step 740 of loading the second capability from the first physical address within the external memory.

Then, the memory-side memory controller may perform step 745 of interpreting a physical address from the second capability. In one example, the second capability already contains a second physical address, in that case the memory-side memory controller performs step 750. In a second example, the second capability contains a second virtual address, then the memory-side memory controller translates the second virtual address to a second physical address (e.g. using an MMU set of page tables, or using a plurality of TLB entries), then the memory-side memory controller performs step 750.

Once the memory-side memory controller interprets the second capability as the second physical address at step 745, the memory-side memory controller may perform step 750 of checking whether the second capability is a valid capability or not (e.g. using the validity bit, or using the cryptographic signature). If the second capability is not a valid capability (NO branch of step 750), the memory-side memory controller may perform step 755 of revoking access to the external memory and therefore, denying access to the dataset. If step 750 determines that the second capability is a valid capability (YES branch of step 750), then the memory-side memory controller may perform step 760 of retrieving the dataset from the second physical address within the external memory.

Then, at step 765, the system may utilize an output mechanism (e.g. CPU cache, register, both the CPU cache and the register) to make the dataset and the second physical address available to the client application. At step 770, the client application may consume the dataset and continue with its operation (step 775).

Figure 8A:
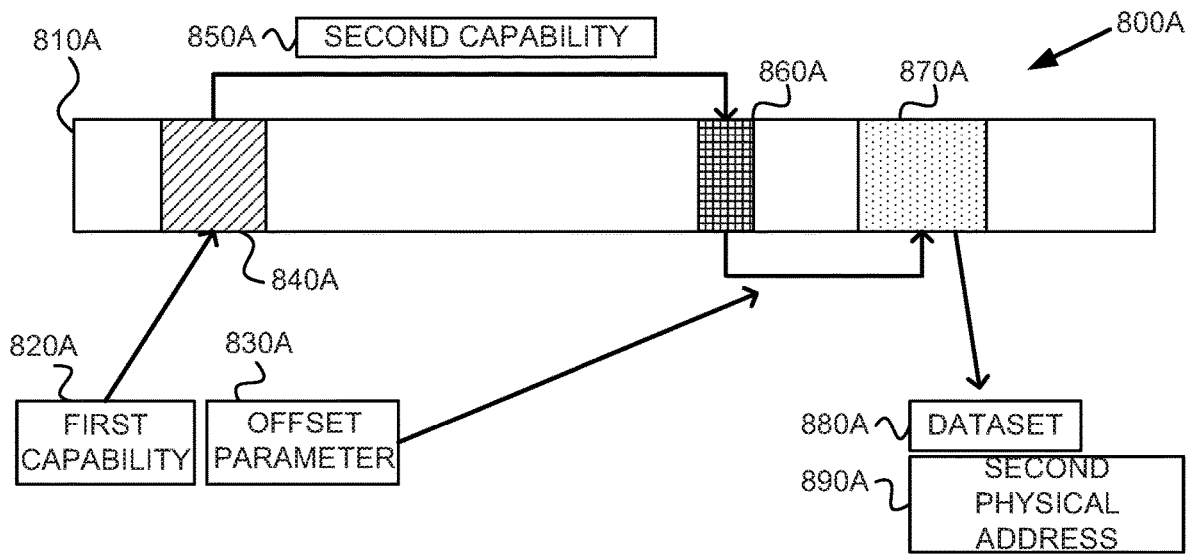
FIG. 8A is a block diagram illustrating an example of accessing a dataset using two capabilities and an offset parameter.

FIG. 8A is a block diagram illustrating an example for accessing a dataset using two capabilities and an offset parameter. System 800A comprises an external memory 810A, a first capability 820A, an offset parameter 830A, a first physical address location 840A, a second capability 850A, a second capability pointing address location 860A, and a second physical address location 870A. The external memory 810A may be the same as or similar to the external memory 140 from FIG. 1.

The client application may input a first capability 820A and an offset parameter 830A. As disclosed above, the first capability 820A may comprise either a first physical address or a first virtual address. If the first capability 820A contains a first virtual address, the first virtual address may be translated into a first physical address. In both scenarios, a first physical address and an offset parameter 830A may be sent to the memory-side memory controller. The first physical address from the first capability 820A may point to the first physical address location 840A from the external memory 810A. The first physical address location 840A from the external memory 810A may comprise the second capability 850A, and the second capability 850A may be loaded by the memory-side memory controller. The memory-side memory controller may interpret the second capability 850A as a second capability pointing address, which is a physical address that points to the second capability pointing address location 860A in the external memory 810A. Then the memory-side memory controller may calculate the second physical address 890A by applying the offset parameter 830A to the second capability pointing address location 860A. The second physical address may point to the second physical address location 870A. In the present disclosure, the offset parameter 830A may be understood as an integer indicating the displacement distance between the second capability pointing address location 860A, and the second physical address location 870A. Once the second physical address 890A is calculated, the memory-side memory controller may load the dataset 880A stored in the second physical address location 870A. The memory-side memory controller may return the dataset 880A located in the second physical address location 870A, and the second physical address 890A to the CPU through the memory fabric.

Figure 8B:
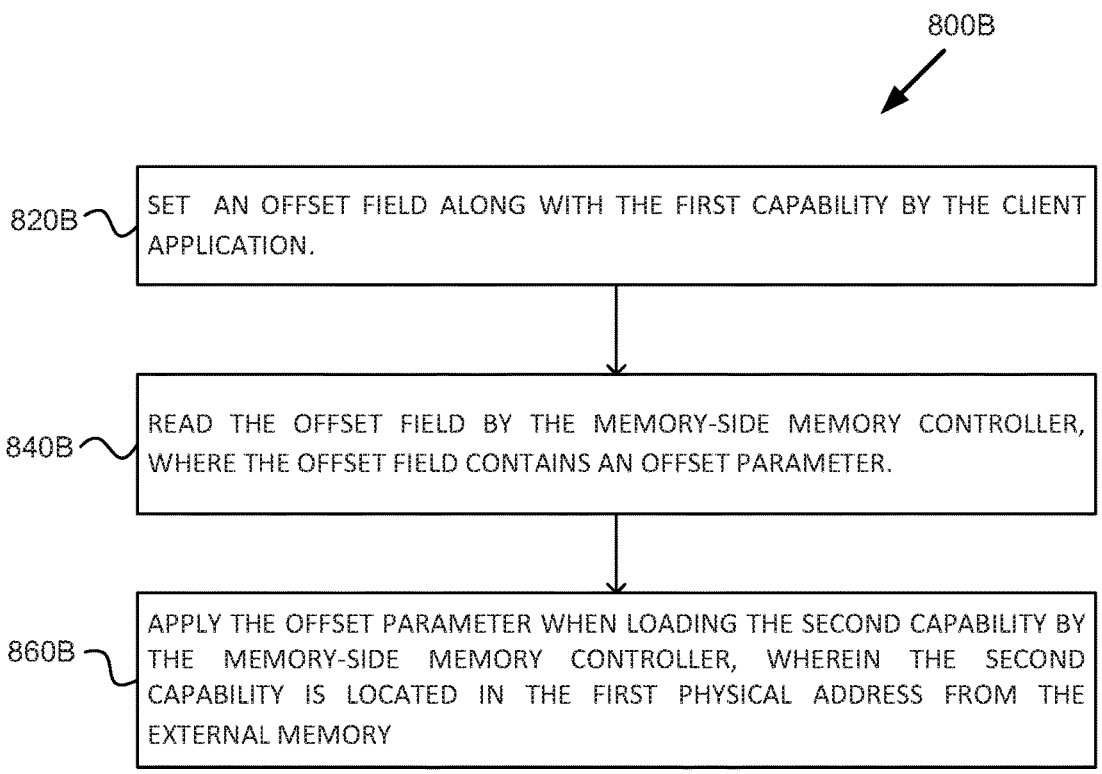
FIG. 8B is a flow chart of an example of accessing a dataset using two capabilities and an offset parameter.

FIG. 8B is a flow chart of an example for accessing a dataset using two capabilities and an offset parameter. Method 800B may be performed, for example, by system 800A from FIG. 8A. Method 800B as well as the other methods described herein can, for example, be implemented in the form of machine readable instructions stored on a memory of a computing system, in the form of electronic circuitry or another suitable form. Method 800B may be used by the memory-side memory controller 120 from FIG. 1.

Method 800B may include the step 820B of setting an offset field along with the first capability by the client application.

Method 800B may include the step 840B of reading the offset field by the memory-side memory controller, where the offset field contains an offset parameter.

Method 800B may include the step 860B of applying the offset parameter when loading the second capability by the memory-side memory controller, wherein the second capability is located in the first physical address from the external memory.

Figure 9:
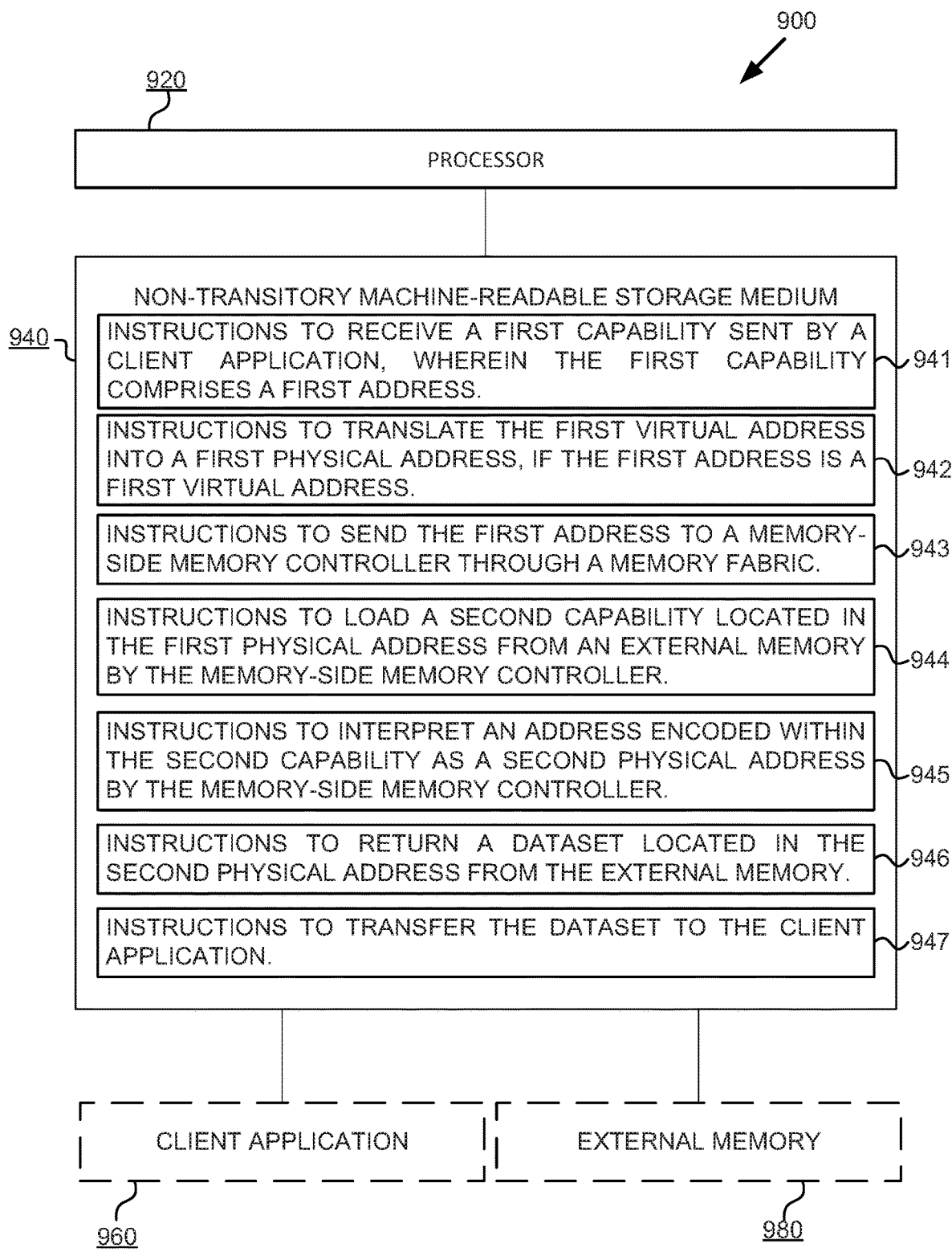
FIG. 9 is a block diagram illustrating another system example of a memory-side memory controller interpreting capabilities and returning a dataset.

FIG. 9 is a block diagram illustrating another system example for a memory-side memory controller interpreting capabilities. FIG. 9 describes a system 900 that includes a physical processor 920 and a non-transitory machine-readable storage medium 940. The processor 920 may be a microcontroller, a microprocessor, a central processing unit (CPU) core, an application-specific integrated circuit (ASIC), a field programmable gate array (FPGA), and/or the like. The machine readable storage medium 940 may store or be encoded with instructions 941 to 947 that may be executed by the processor 920 to perform the functionality described herein. System 900 may be connected to a client application 960 and an external memory 980. System 900 entities may be the same as or similar to entities in system 100 of FIG. 1. System 900 may use the method 600 of FIG. 6.

In an example, the instructions 941 to 947, and/or other instructions can be part of an installation package that can be executed by processor 920 to implement the functionality described herein. In such a case, non-transitory machine readable storage medium 940 may be a portable medium such as a compact disc (CD), digital versatile disk (DVD), or flash device or a memory maintained by a computing device from which the installation package can be downloaded and installed. In another example, the program instructions may be part of an application or applications already installed in the non-transitory machine-readable storage medium 940.

The non-transitory machine readable storage medium 940 may be any electronic, magnetic, optical, or other physical storage device that contains or stores executable data accessible to the system 900. Thus, non-transitory machine readable storage medium 940 may be, for example, a Random Access Memory (RAM), an Electrically Erasable Programmable Read-Only Memory (EEPROM), a storage device, an optical disc, and the like. The non-transitory machine readable storage medium 940 does not encompass transitory propagating signals. Non-transitory machine readable storage medium 940 may be allocated in the system 900 and/or in any other device in communication with the system 900.

In the example of FIG. 9, the processor 920 is coupled to the non-transitory machine-readable storage medium 940, the non-transitory machine-readable storage medium 940 comprising a plurality of instructions 941. The instructions 941, when executed by the processor 920, cause the processor 920 to receive a first capability sent by a client application 960, where the first capability comprises a first address. The instructions 942, when executed by the processor 920, cause the processor 920 to translate the first virtual address into a first physical address, if the first address is a first virtual address. The instructions 943, when executed by the processor 920, cause the processor 920 to send the first physical address to a memory-side memory controller through a memory fabric. The instructions 944, when executed by the processor 920, cause the processor 920 to load a second capability located in the first physical address from an external memory 980 by the memory-side memory controller. The instructions 945, when executed by the processor 920, cause the processor 920 to interpret an address encoded within the second capability as a second physical address by the memory-side memory controller. The instructions 946, when executed by the processor 920, cause the processor 920 to return a dataset located in the second physical address from the external memory 980. The instructions 947, when executed by the processor 920, cause the processor 920 to transfer the dataset to the client application 960.

The non-transitory machine readable storage medium 940 may include further instructions that are executable by the processor 920, that cause the processor 920 to set an offset field along with the first capability, read the offset field, where the offset field contains an offset parameter, and apply the offset parameter when loading the second capability, wherein the second capability is located in the first physical address from the external memory.

The above examples may be implemented by hardware, firmware, or a combination thereof. For example, the various methods and processes described herein may be implemented by a physical processor (the term processor is to be interpreted broadly to include CPU, processing module, ASIC, logic module, or programmable gate array, etc.). The processes and methods may all be performed by a single processor or split between several processors; reference in this disclosure or the claims to a "processor" should thus be interpreted to mean "at least one processor". The processes and methods are implemented as machine readable instructions executable by at least one processor, hardware logic circuitry of the at least one processors, or a combination thereof.

What has been described and illustrated herein is an example of the disclosure along with some of its variations. The terms, descriptions and figures used herein are set forth by way of illustration. Many variations are possible within the scope of the disclosure, which is intended to be defined by the following claims and their equivalents.

What is claimed is:

1. A computing system comprising:
a Central Processing Unit (CPU) configured to translate a first address in a first capability to a first physical address and send the first physical address to a memory-side memory controller of the computing system coupled to the CPU through a memory fabric, the first capability sent by a client application and the CPU operating in a local side of the computing system;
the memory-side memory controller coupled to an external memory, the memory-side memory controller configured to:
load a second capability located in the first physical address from the external memory;
interpret an address encoded within the second capability as a second physical address; and
return a dataset located in the second physical address from the external memory to the CPU through the memory fabric,
wherein the memory-side memory controller operates in an external memory-side of the computing system separate from the local side, the memory-side memory controller configured to perform dereference operations in-memory without returning the second capability to the CPU.

2. The computing system of claim 1, wherein the first address is a first virtual address and
the CPU further comprises a translation mechanism managed by an Operating System (OS) to translate the first virtual address to the first physical address.

3. The computing system of claim 1, wherein the second capability contains the second physical address and
the memory-side memory controller is configured to directly dereference the second capability and load the dataset from the second physical address.

4. The computing system of claim 1, wherein the second capability contains a virtual address and the computing system further comprises:
a Memory Management Unit (MMU) associated with the CPU such that all memory references from the CPU pass through the MMU, the MMU having access to a set of page tables; and
a memory-side memory controller cache, wherein the memory-side memory controller is configured to receive the set of page tables of the MMU from the CPU and store the received set of page tables of the MMU in the memory-side memory controller cache,
wherein the memory-side memory controller is configured to translate the virtual address contained in the second capability to a physical address based on the set of page tables,
wherein the MMU comprises one of a port of the CPU or a separate Integrated Circuit (IC) communicatively coupled to the CPU.

5. The computing system of claim 1, wherein the second capability contains a second virtual address and the computing system further comprises:
a Translation Look-Aside Buffer (TLB) associated with the CPU, the TLB comprising a memory cache of the CPU and comprising a plurality of TLB entries that comprise a mapping from the second virtual address to the second physical address; and
a memory-side memory controller cache, wherein the memory-side memory controller is configured to receive the plurality of TLB entries and store the received plurality of TLB entries in the memory-side memory controller cache,
wherein the memory-side memory controller is configured to translate the second virtual address contained in the second capability to a second physical address based on the plurality of TLB entries.

6. The computing system of claim 1,
wherein the client application sets an offset field along with the first capability; and
wherein the memory-side memory controller is further configured to:
read the offset field, wherein the offset field contains an offset parameter, and
apply the offset parameter when loading the second capability located in the first physical address from the external memory.

7. The computing system of claim 1, further comprising a mechanism to validate a capability, the mechanism configured to detect whether a capability is a valid capability,
wherein the CPU and the memory-side memory controller are configured to reject access to the external memory in response to determining by the mechanism that the first capability is not a valid capability.

8. The computing system of claim 7, further comprising:
a local memory coupled to a local memory controller of the CPU, the local memory configured to store a validity bit, wherein the validity bit is configured to instruct the CPU to determine whether the first capability is a valid capability and to instruct the memory-side memory controller to determine whether the second capability is a valid capability; and
the CPU is configured to transfer the validity bit to the memory-side memory controller over the memory fabric,
wherein the local memory controller is configured to control access by the CPU to the local memory to access the validity bit.

9. The computing system of claim 7, further comprising
a local memory coupled to a local memory controller of the CPU, the local memory configured to store a cryptographic signature, wherein the cryptographic signature is configured to instruct the CPU to determine whether the first capability is a valid capability and to instruct the memory-side memory controller to determine whether the second capability is a valid capability;

wherein the CPU is configured to transfer the cryptographic signature to the memory-side memory controller, wherein the local memory controller is configured to control access by the CPU to the local memory to access the cryptographic signature.

10. The computing system of claim 1, further comprising an output mechanism configured to transfer the dataset to the client application to consume.

11. A method comprising:
receiving a first capability by a CPU, wherein the first capability comprises a first address and the first capability is sent by a client application and the CPU operates in a local side of a computing system;
if the first address is a first virtual address, translating the first virtual address to a first physical address by the CPU;
sending the first physical address to a memory-side memory controller by the CPU through a memory fabric;
loading a second capability located in the first physical address from an external memory by the memory-side memory controller;
interpreting an address encoded within the second capability as a second physical address by the memory-side memory controller; and
returning a dataset located in the second physical address to the CPU from the external memory,
wherein the memory-side memory controller operates in an external memory-side of the computing system separate from the local side, the memory-side memory controller configured to perform dereference operations in-memory without returning the second capability to the CPU.

12. The method of claim 11, further comprising:
accessing a set of page tables by a Memory Management Unit (MMU); and
translating the first virtual address to the first physical address based on the set of page tables.

13. The method of claim 11, further comprising:
accessing a plurality of Translation Look-Aside Buffer (TLB) entries from a TLB; and
translating the first virtual address to the first physical address based on the TLB entries.

14. The method of claim 11, further comprising:
setting on offset field along with the first capability by the client application;
reading the offset field by the memory-side memory controller, wherein the offset field contains an offset parameter; and
applying the offset parameter when loading the second capability by the memory-side memory controller from the external memory, wherein the second capability is located in the first physical address.

15. The method of claim 11, further comprising:
determining whether the first capability is a valid capability based on a mechanism to validate a capability; and
if the first capability is not a valid capability, rejecting access to the external memory.

16. The method of claim 15, further comprising:
storing a validity bit in a local memory by an Operating System (OS);
accessing the validity bit by a local memory controller of the CPU;
transferring the validity bit to the memory-side memory controller by the CPU through the memory fabric; and
determining whether the first capability is a valid capability, based on the validity bit, by the CPU and determining whether the second capability is a valid capability, based on the validity bit, by the memory-side memory controller.

17. The method of claim 15, further comprising:
storing a cryptographic signature in a local memory by the OS;
accessing the cryptographic signature by a local memory controller of the CPU;
transferring the cryptographic signature to the memory-side memory controller by the CPU through the memory fabric; and
determining whether the first capability is a valid capability based on the cryptographic signature by the CPU and determining whether the second capability is a valid capability based on the cryptographic signature by the memory-side memory controller.

18. The method of claim 11, further comprising transferring the dataset to the client application to consume, via an output mechanism.

* * * * *